United States Patent [19]
Dail

[11] Patent Number: 5,864,748
[45] Date of Patent: Jan. 26, 1999

[54] HYBRID FIBER-COAX SYSTEM HAVING AT LEAST ONE DIGITAL FIBER NODE AND INCREASED UPSTREAM AND DOWNSTREAM BANDWIDTH

[75] Inventor: James E. Dail, Marlboro, N.J.

[73] Assignee: AT&T Corp., Middletown, N.J.

[21] Appl. No.: 718,112

[22] Filed: Sep. 18, 1996

[51] Int. Cl.[6] .................................................. H04N 7/173
[52] U.S. Cl. .............................................. 455/5.1; 348/12
[58] Field of Search .............................. 455/5.1, 3.1, 4.1, 455/4.2, 6.2, 6.1, 6.3, 14; 348/6, 7, 10, 11, 12, 13, 14, 15, 16, 17, 18; 375/211, 214; H04N 7/16, 7/173

[56] References Cited

U.S. PATENT DOCUMENTS

| | | | |
|---|---|---|---|
| 3,835,393 | 9/1974 | Marron | 455/5.1 |
| 4,959,862 | 9/1990 | Davidov et al. | 380/10 |
| 5,390,337 | 2/1995 | Jelinek et al. | 455/5.1 |
| 5,408,259 | 4/1995 | Warwick | 348/6 |
| 5,499,047 | 3/1996 | Terry et al. | 348/6 |
| 5,528,582 | 6/1996 | Bodeep et al. | 370/24 |
| 5,534,912 | 7/1996 | Kostreski | 348/6 |
| 5,557,319 | 9/1996 | Gurusami et al. | 348/11 |
| 5,561,404 | 10/1996 | Ross | 333/28 R |
| 5,606,725 | 2/1997 | Hart | 455/5.1 |
| 5,625,865 | 4/1997 | Moehrmann | 348/12 |

*Primary Examiner*—Chris Grant
*Attorney, Agent, or Firm*—Robert B. Levy

[57] ABSTRACT

Noise is reduced and bandwidth may be increased in a CATV transmission system by modulating a portion of subscriber-generated upstream signals to a high frequency band (e.g., 750–100 MHz) and then digitally regenerating such signals. To further reduce noise, the digitally regenerated upstream signals are transmitted by in a baseband digital format to the head end (120) via a digital E/O converter (330). Increased downstream bandwidth is obtained by modulating a portion of the downstream signals to a higher frequency band (e.g., 500–750 MHz) and then digitally regenerating such signals.

14 Claims, 2 Drawing Sheets

HYBRID FIBER-COAX SYSTEM HAVING AT LEAST ONE DIGITAL FIBER NODE AND
INCREASED UPSTREAM AND
DOWNSTREAM BANDWIDTH

BACKGROUND ART

This invention relates to a technique for reducing ingress noise in a shared hybrid fiber-coax transmission system and for providing increased upstream and downstream bandwidth.

TECHNICAL FIELD

There now exist transmission systems that provide two-way transmission of information; e.g., video, audio, multi-media and/or data; between a head end and a plurality of subscribers. Typically, the head end transmits the information destined for individual subscribers ("downstream information") in an optical format, via one or more fiber optic links, to one or more fiber nodes. Each fiber node converts the optically-formatted downstream information into an electrical signal for distribution to individual subscribers via a coaxial cable plant having a tree and branch architecture.

In addition to receiving the downstream information, each individual subscriber may generate information; in the form of voice, video, or data signals, or any combination thereof; destined for the head end. The subscriber-generated signals ("upstream information") are aggregated by the coaxial cable plant and pass to the fiber node for optical formatting for transmission to the head end. The bandwidth (e.g., 5–40 MHz) associated with the upstream information is shared by all subscribers served by the same fiber node. Any noise and/or electrical interference (hereinafter, "ingress noise") originating at an individual subscriber premises aggregates with the noise at the other subscriber premises, degrading the overall quality of the upstream information.

Noise measurements in present day cable systems have shown that noise and interference are very high in the 5–40 MHz band. There are numerous sources of noise in this frequency band. For example, amateur, citizens band, and mobile radio systems operate in the 5–40 MHz band and constitute a source of noise. Home appliances also generate noise in the 5–40 MHz band. The aggregation (summing) of the upstream signals may simplify the overall transmission but results in a compromise in signal quality and bandwidth availability.

In U.S. patent application Ser. No. 08/650,683, "Shared Hybrid fiber-Coax Network Having Reduced Ingress Noise," filed May 20, 1996, in the name of James E. Dail, and assigned to AT&T Corp., (herein expressly incorporated by reference), a hybrid fiber-coax transmission system is disclosed in which the upstream information is digitally regenerated within the coax cable plant to reduce ingress noise. In this way, the upstream information received at each fiber node is substantially noise free. However, present day fiber nodes typically convert the upstream information into an optical format via a linear electrical-to-optical converter. The linear electrical-to-optical converters used in present day hybrid fiber-coax networks have limited dynamic range and are influenced by the presence of noise and/or interference at their inputs. As a result, the upstream information transmitted back to the head end by each fiber node may still suffer an impairment in terms of signal quality and bandwidth availability. While this solution resolves the noise and interference problem, it does not reduce the impairments in the linear optics, or the high cost, nor does it provide enough bandwidth for high market penetration of broadband services.

Another proposed solution is to employ so-called Mini-Fiber-Nodes (mFNs) wherein additional fibers run from the head-end to trunk and line extender amplifier locations in the coaxial cable plant. The mFNs are co-located with the trunk and line extender amplifier locations and employ a relatively inexpensive laser to transmit signals back to the head end. This solution also overcomes the problem of ingress noise by operating in a higher frequency band (750–1000 MHz) as well as by reducing the number of HouseHolds Passed (HHPs) per mini-fiber node. Further, this solution provides a sufficient amount of bandwidth for the upstream information. However, the cost of running such fibers to each amplifier is significant.

Thus, there is a need for reducing the incidence of noise in a shared hybrid fiber-coax transmission system attributable to conversion of upstream information into an optical format for transmission to the head end and for increasing the upstream bandwidth.

BRIEF SUMMARY OF THE INVENTION

Briefly, in accordance with a preferred embodiment of the invention, a method is provided for achieving reliable signal transmission in a CATV system with reduced noise, as well as increased bandwidth in both the upstream and downstream directions. Pursuant to the invention, at least a portion of the upstream signals originating at subscriber premises are digitally modulated via a carrier to a high frequency band (typically 750–1000 MHz) that is allocated to for upstream information transmission. The high frequency upstream signals are digitally regenerated by at least one repeater. The high frequency upstream signals regenerated by the repeater are transmitted in a digital baseband, optical format across an optical fiber to a head end by a digital electrical-to-optical converter, as taught in U.S. patent application Ser. No. 08/678,836, "Hybrid Fiber Coax System Having At Least One Digital Fiber Node", filed in the name of James E. Dail on Jul. 12, 1996, and assigned to AT&T Corp. (herein expressly incorporated by reference). The transmission of the high frequency digitally regenerated upstream signals in a baseband digital format reduces the incidence of ingress noise attributable to prior-art transmission systems that utilize linear Electrical-to-Optical (E/O) devices for transmitting the upstream signals in an optical format to the head end.

Downstream signals, typically those lying in a frequency band of 500–750 MHz, may also be digitally regenerated by one or more repeaters in accordance with the invention, allowing this signal band to be used for downstream signals that would otherwise be degraded by noise. Each repeater, by its nature, will generate an essentially noise-free output signal for transmission if the signal-to-noise ratio of the signals input to the repeaters is adequate, which is usually the case. From a noise perspective, deploying repeaters in this manner accomplishes the same effect for upstream signals as reducing the number of HHPs served by each fiber node, without actually reducing the number of HHPs that are served. Moreover, since the upstream and downstream repeaters operate in a high frequency band, there is sufficient bandwidth for emerging broadband services and high market penetration.

DETAILED DESCRIPTION

Figure 1:
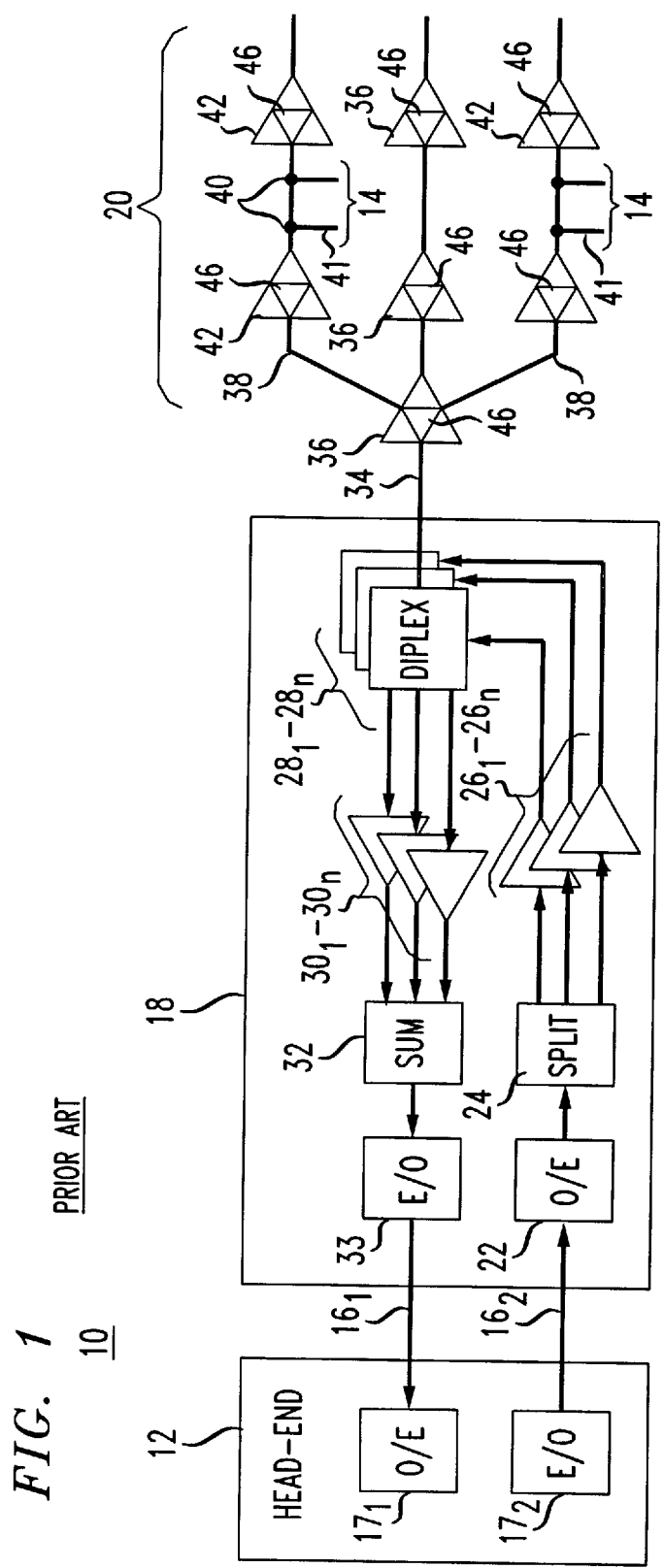
FIG. 1 is a block schematic diagram of a hybrid fiber-coax transmission system in accordance with the prior art.

FIG. 1 depicts a hybrid fiber-coax transmission system 10 in accordance with the prior art. The system 10 includes a head end 12 for generating information; e.g., video, audio, multimedia and/or data ("downstream information"); for transmission to individual subscribers 14—14. The head end also receives information, ("upstream information"); e.g., video, audio, multimedia and/or data; generated by one or more of the subscribers 14—14. In practice, a combination of optical fibers and coaxial cables carry the downstream information from the head end 12 to the subscribers 14—14 and carry the upstream information from the subscribers to the head end. As seen in FIG. 1, an optical fiber link 161 carries upstream information in optical format to the head end 12 from a fiber node 18 that receives the information from subscribers 14—14 via a coaxial cable plant 20. At the head end 12, an optical-to-electrical (O/E) converter 17, converts the optically formatted information upstream information into an electrical signal for subsequent processing. An electrical-to-optical (E/O) converter $17_2$ within the head end 12 optically formats downstream information for transmission via a downstream fiber $16_2$ to the fiber node 18 for distribution to subscribers 14—14 via the coaxial cable plant 20.

The fiber node 18 according to the prior art typically includes an O/E converter 22 for converting the optically-formatted downstream information, received via the fiber link $16_2$, into a downstream electrical signal. A splitter 24 splits the downstream electrical signal produced by the O/E converter 22 into n downstream sub-signals (where n is an integer, typically three or four). Each of amplifiers $26_1$-$26_n$ amplifies a separate one of the n downstream sub-signals from the O/E converter 22 for input to a separate one of diplexers $28_1$-$28_n$, respectively. Each of the diplexers $28_1$-$28_n$ supplies a separate trunk 34 in the coaxial cable distribution plant 20 with a downstream sub-signal. Additionally, each of the diplexers $28_1$-$28_n$ serves to strip-off upstream signals received on each individual trunk 34 of the coaxial distribution plant 20 from the subscribers 14—14.

The n upstream signals separated by diplexers $28_1$-$28_n$ are amplified by a separate one of amplifiers $30_1$-$30_n$, respectively. A summer 32 sums the signals amplified by the amplifiers $30_1$-$30_n$ to yield a composite signal that is converted into an optical format via an E/O converter 33 having a linear transmitter (not shown). The optically-formatted signal produced by the linear E/O converter 33 passes via the optical fiber link $16_1$ to the head end 12.

As discussed, the coaxial cable distribution plant 20 comprises n main coaxial cable trunks 34—34 (only one shown). Typically, one or more trunk amplifiers 36—36 are disposed along each main trunk 34 for amplifying upstream and downstream signals and for supplying downstream signals to, and for receiving upstream signals from, one or more coaxial cable branches 38—38. Each branch 38 has one or more taps 40—40, each connected to one or more individual subscribers 14—14 via one of feeders 41—41. One or more branch amplifiers (line extenders) 42—42 may be disposed along each branch 38 to amplify the upstream and downstream signals on the branch.

The hybrid fiber-coax transmission system 10 of FIG. 1 suffers from the disadvantage that ingress noise originating from individual subscribers 14—14 tends to aggregate in the coax plant, impairing performance of the system. Further, the upstream signals generated by the subscribers 14—14 have traditionally been modulated to the 5–40 MHz frequency band, limiting the bandwidth available to support multiple services.

Figure 2:
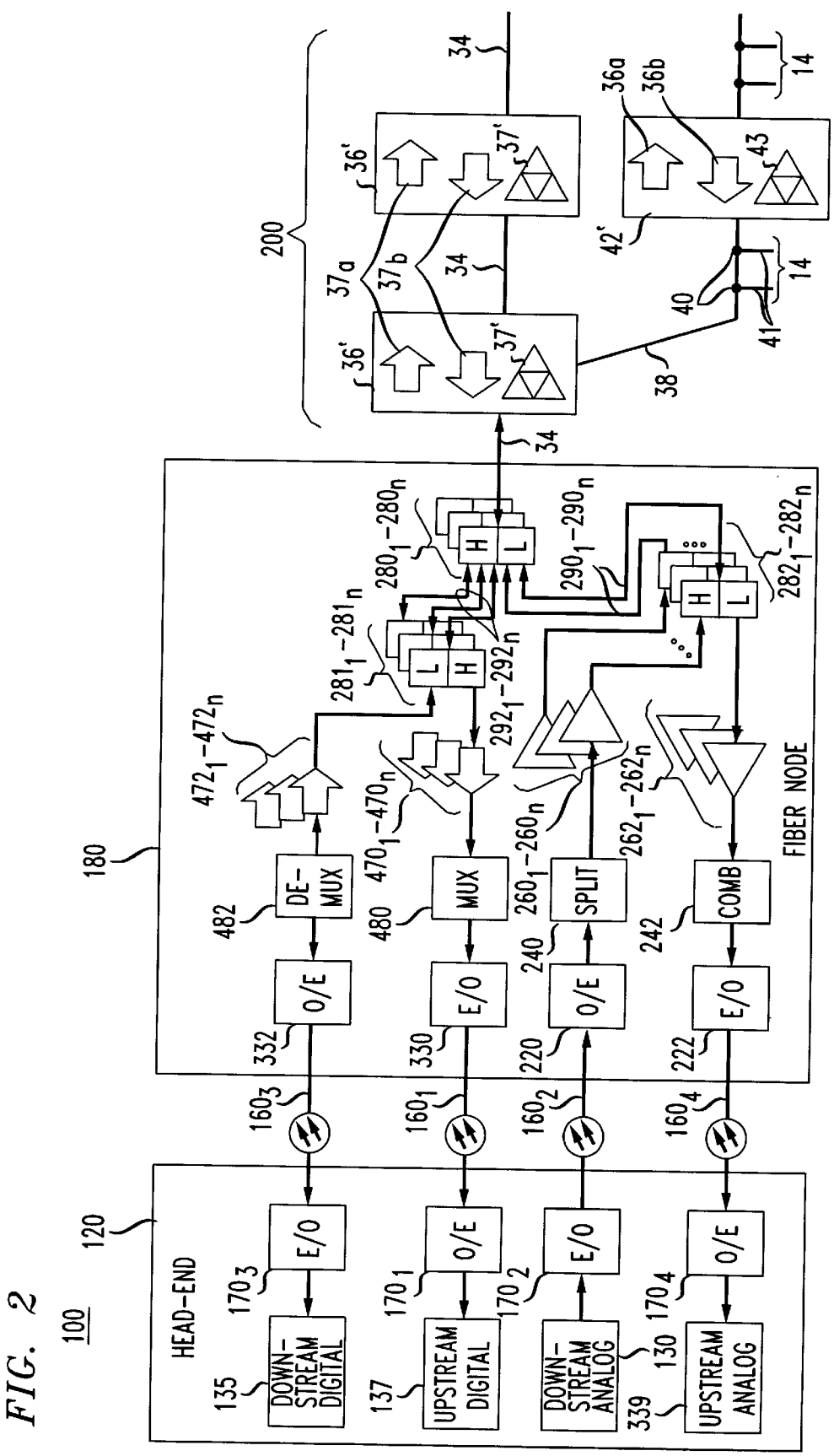
FIG. 2 is a block schematic diagram of a hybrid fiber-coax system in accordance with the teachings of the invention.

FIG. 2 depicts a hybrid fiber-coax transmission system 100 in accordance with the present invention that reduces the incidence of ingress noise and that affords greater bandwidth. The system 100 comprises a head end 120 having a first signal source 130 that originates an analog downstream signal lying within a first frequency band (e.g., 50–500 MHz). The analog downstream signal typically carries broadcast video information. A first E/O converter $170_2$ converts the analog downstream signal to an optical format for transmission along an optical fiber link $160_2$ to a fiber node 180.

In accordance with the invention, the head end 120 includes a second signal source 135 that generates a digital downstream signal lying in a second frequency band (e.g., 500–750 MHz) above the first downstream signal. The digital downstream signal typically carries signals associated with services other than analog broadcast video, such as telephony, digital video, data, etc. A second E/O converter $170_3$ converts the digital downstream signal to a digital optical format for transmission along an optical fiber link $160_3$ to the fiber node 180. As will be discussed below, the fiber node 180 converts these optically formatted downstream signals into electrical signals for transmission along a common trunk 34 of the cable plant 200. In addition, the fiber node 180 also receives from the coaxial cable plant 200 high frequency digital upstream signals and low frequency analog upstream signals generated by individual subscribers 14—14. The high and low frequency upstream signals received at the fiber node 180 from the subscribers 14—14 are optically formatted by the fiber node 180 for transmission to the head end 120 along fiber links $160_1$ and $160_4$, respectively. At the head end 120, first and second O/E converters $170_1$ and $170_4$ convert the optically formatted high frequency and low frequency upstream signals, respectively, to electrical signals for receipt at upstream signal sinks 137 and 139, respectively.

The coaxial cable plant 200 depicted in FIG. 2 is configured in the manner taught in U.S. patent application Ser. No. (Peyrovian 2) filed on Aug. 26, 1996, in the name of M. Javad Peyrovian, and assigned to AT&T Corp., herein expressly incorporated by reference. The cable plant 200 includes n (where n is typically three or four) coaxial cable trunks 34—34 (only one being shown). Each cable trunk 34 is supplied from the fiber node 180 with the low frequency analog and high frequency digital downstream signals. Disposed along each trunk 34 is one or more trunk amplifiers 36'—36'. As taught in the aforementioned application Ser. No. (Peyrovian 2), each trunk amplifier 36' includes downstream and upstream amplifiers 37' and regenerators 37a and 37b. The downstream regenerator 37a regenerates the high frequency digital downstream signal in accordance with the teachings of the aforementioned U.S. patent application Ser. No. 08/650,683 (expressly incorporated by reference herein) to reduce the incidence of ingress noise. By the same token, the upstream regenerator 37b regenerates subscriber-generated upstream signals that are modulated onto a high frequency band (e.g., 750–100 MHz), thereby reducing the incidence of noise. Each trunk amplifier 36' also includes an amplifier assembly 37' having separate upstream and downstream amplifying elements and associated diplexers (not shown) for amplifying the low frequency downstream and low frequency upstream signals, respectively.

One or more of the trunk amplifiers 36'—36' may supply the low and high frequency downstream signals to, and receive the high and low frequency signals upstream signals from, one or more branches 38 (only one shown). Individual subscribers 14—14 are coupled to each branch 38 via a corresponding one of taps 40—40 and feeders 41—41. Each branch 38 typically has at least one line extender 42' disposed along its length. Each line extender 42' includes downstream and upstream regenerators 36a and 36b for regenerating the high frequency downstream and upstream signals, respectively. Further, each line extender 42' includes an amplifier assembly 43 having separate upstream and downstream amplifying elements and associated diplexers (not shown) for amplifying the low frequency upstream and low frequency downstream signals, respectively.

The fiber node 180 of the present invention includes a first linear O/E converter 220 for converting the optically formatted high frequency analog downstream signal received on the fiber link $160_2$ to an electrical signal. A splitter 240 splits the output signal of the O/E converter 220 into n downstream sub-signals (where n is an integer corresponding to the number of the trunks 34 coupled to the fiber node 180). Each of amplifiers $260_1$ -$260_n$ amplifies a separate one of the n sub-signals prior to receipt at the high frequency (50–500 MHz) input of a separate one n diplexers $282_1$-$282_n$. Each of diplexers $282_1$-$282_n$ separates the low frequency downstream sub-signal from an incoming low frequency upstream signal. In the preferred embodiment, each of the diplexers $282_1$-$282_n$ separates downstream signals in the 50–500 MHz frequency band from upstream signals in the 5–40 MHz band.

Each of cables $290_1$-$290_n$ couples a corresponding one of diplexers $282_1$-$282_n$ to one of diplexers $280_1$-$280_n$, respectively. In the preferred embodiment, each of diplexers $280_1$-$280_n$ separates high frequency signals (those in the 500–1000 MHz frequency band) on each trunk 34 from signals below that frequency band. Thus, the diplexers $280_1$-$280_n$ separate the high frequency digital downstream signal and the high frequency upstream signals from the low frequency downstream sub-signal and low frequency upstream signals. The low frequency downstream sub-signal received at each of the diplexers $280_1$-$280_n$ from a corresponding one of the diplexers $282_1$-$282_n$, respectively, is injected on a corresponding one of the trunks 34 of the cable plant 200 for distribution to individual subscribers 14—14.

Low frequency upstream signals received at the fiber node 180 from each trunk 34 are separated by a corresponding one of the diplexers $280_1$-$280_n$ for passage to a corresponding one of the diplexers $282_1$-$282_n$. Each of the diplexers $282_1$-$282_n$ passes the low frequency upstream signals received from each of the diplexers $280_1$-$280_n$ to a corresponding one of amplifiers $262_1$-$262_n$ for amplification. A combiner 242 combines the output signals of the amplifiers $262_1$-$262_n$ to yield a composite low frequency upstream signal for input to a first E/O converter 222. The E/O converter 222 is typically linear in nature, like the E/O converter 33 of FIG. 1, and optically formats the low frequency upstream signals for passage on the fiber link $160_4$ to the head end 120.

As discussed, the diplexers $280_1$-$280_n$ separate high frequency signals (those in the 500–1000 MHz frequency band) from lower frequency signals (those in the 5-500 MHz band). The high frequency signals separated by the diplexers $280_1$-$280_n$ pass via cables $292_1$-$292_n$, respectively, to diplexers $281_1$-$281_n$, respectively. Each of diplexers $281_1$-$281_n$ further separates the signals in the 500–750 MHz from those in the 750-1000 MHz band. Upstream signals in the 750–100 MHz frequency band received at each of the diplexers $281_1$-$281_n$ from a corresponding one of the diplexers $280_1$-$280_n$ pass to a separate one of digital repeaters $470_1$-$470_n$.

Each of the digital repeaters $470_1$-$470_n$ is configured in the manner taught in the aforementioned U.S. patent application Ser. No. 08/650,683 and serves to digitally regenerate the incoming high frequency upstream signals separated by a corresponding one of the diplexers $281_1$-$281_n$ into baseband signals. In this way, the incidence of ingress noise accompanying the high frequency upstream signals is reduced. The high-frequency upstream signals digitally regenerated by the repeaters $470_1$-$470_n$ into baseband signals are multiplexed by a multiplexer 480 to yield a digitized composite base band upstream signal. A digital E/O converter 330 of the type described in the aforementioned U.S. patent application Ser. No. 08/678,836 expressly incorporated by reference optically formats the base band upstream signal into a format for transmission via the optical fiber link $160_1$ to the head end 120.

As discussed the diplexers $281_1$-$281_n$ separate signals in the 500–750 MHz frequency band from signals in the 750–1000 MHz frequency band. In the preferred embodiment, the signals in the 500–750 MHz band constitute downstream information (other than analog broadcast video) supplied to the fiber node 180 via the fiber link $160_3$. A digital O/E converter 332 converts such optically formatted high frequency downstream information into an electrical signal that is de-multiplexed by a demultiplexer 482 into n separate sub-signals. Each sub-signal produced by the demultiplexer 482 is analog modulated to a high frequency signal by a separate one transmitters $472_1$-$472_n$.

Each of the n separate high frequency downstream sub-signals generated by a corresponding one of the transmitters $472_1$-$472_n$ passes via a corresponding one of diplexers $281_1$-$281_n$ for input to a separate one of diplexers $280_1$-$280_n$. Each of diplexers $280_1$-$280_n$ injects a corresponding one of the n high frequency downstream sub-signals onto a separate trunk 34 of the coaxial cable plant 200 for receipt by the subscribers $141_4$.

The foregoing describes a technique for achieving reduced noise and high bandwidth in a CATV transmission system. By modulating a portion of the upstream signals to a high frequency band (e.g., 750–100MHz) and then digitally regenerating such signals, higher upstream bandwidth, as well as reduced noise, is achieved. Additionally, noise is further reduced by transmitting the digitally regenerated upstream signals in a baseband digital format via a digital E/O converter 330. Increased downstream bandwidth is obtained by setting aside a portion of the downstream bandwidth (e.g., 500–750 MHz) for signals other than analog broadcast video. Reduced noise is obtained by digitally regenerating such high frequency downstream signals.

It should be understood that the frequency bands described could easily be realized in sequence or bandwidth by changing the frequency cutoffs of the diplexers $280_1$-$280_n$, $281_1$-$281_n$, and $282_1$-$282_n$, and the interconnection of their high and low frequency ports. For example, it may be possible to interchange the high and low frequency downstream bands by simply interchanging the connections between the transmitters $472_1$-$472_n$ and the regenerators $470_1$-$470_n$ to the ports on the diplexers $281_1$281. Other frequency band swaps could similarly be accomplished by rearranging the port connections on the diplexers $281_1$-$281_n$ and $282_1$-$282_n$, coupled with modified modulator and demodulator frequencies.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for use with a CATV transmission system which transmits information from a head-end to individual subscribers and which transmits information from subscribers to the head-end, comprising the steps of:

transmitting upstream information in analog format over a first fiber to a head-end from a fiber node, wherein it is received in analog form in a first frequency band from via a coax cable from subscribers;

transmitting downstream information in analog format over a second fiber from the head-end to the fiber node, wherein it is modulated in a second frequency band in analog form for transmission on the coaxial cable to the subscribers;

transmitting downstream information in a digital format over a third fiber from the head-end to the fiber node, wherein it is modulated to an analog format and shifted to a third frequency band for passage on the coaxial cable to subscribers; and transmitting upstream information in baseband digital format over a fourth fiber to the head-end from the fiber node, wherein it is received in a fourth frequency band on coaxes from subscribers and is regenerated.

2. The method of claim 1 wherein the first frequency band lies within the range of 5–40 MHz.

3. The method of claim 1 wherein the second frequency band lies within the range of 50–500 MHz.

4. The method of claim 1 wherein the third frequency band lies within the range of 500–750 MHz.

5. The method of claim 1 wherein the fourth frequency band lies within the range of 750-1000 MHz.

6. The method of claim 1 wherein received digital signals are received on multiple coaxial cables and are digitally multiplexed into a single digital signal for transmission in a digital optical format back to the head-end.

7. The method of claim 1 wherein the digitally formatted signal from the head-end is transmitted to the fiber node and is digitally demultiplexed to multiple digital signals, modulated to analog format, frequency shifted, and then routed to on multiple coaxial cables to groups of subscribers.

8. The method of claim 1 wherein the analog upstream signals from each coaxial cable is shifted to an individual frequency band before combining in the fiber node and transmission in analog format to the head-end.

9. A method for reducing aggregated ingress upstream noise and for increasing upstream bandwidth in a CATV transmission system that transmits downstream information from a head end to individual subscribers via at least one main coax trunk and that transmits upstream information generated by subscribers to the head end at least in part on said main coax trunk, comprising the steps of:

aggregating onto the main coax trunk upstream information generated by said subscribers;

digitally modulating a first portion of the upstream information to a first frequency band above the downstream information;

digitally regenerating the first portion of the upstream information for transmission on the main coax trunk to a fiber node;

transmitting the digitally regenerated first portion of the upstream information from the fiber node to the head end in an optical baseband format; and digitally regenerating at least a portion of the downstream information lying in a second frequency band lying immediately below the first frequency band.

10. The method according to claim 9 wherein the first frequency band lies within range of 750–1000 MHz.

11. The method according to claim 9 wherein the second frequency band lies within the range of 500–750 MHz.

12. The method according to claim 9 wherein downstream digital information lying below the first frequency band is combined with the digitally regenerated downstream information lying in the second frequency band for transmission to subscribers.

13. The method according to claim 9 wherein the step of transmitting the digitally regenerated first portion of the upstream information in an optical, baseband digital format to the head end comprises the step of converting the first portion of the digitally regenerated upstream information into an optical format via a digital electrical-to-optical converter.

14. The method according to claim 9 wherein the step of digitally regenerating at least a portion of the downstream information lying in a second frequency band lying immediately below the first frequency band includes the steps of:

receiving said portion of the downstream information in an optical format;

converting the optically formatted downstream information portion into a plurality of downstream sub-signals; and digitally regenerating each sub-signal.

* * * * *